United States Patent [19]

Newton et al.

[11] Patent Number: 5,756,034
[45] Date of Patent: May 26, 1998

[54] MOLDED BOAT HULL HAVING IN SITU HOLES TO ACCOMMODATE THROUGH-HULL FITTINGS

[76] Inventors: John R. Newton, 207 Elsa Rd., Jupiter, Fla. 33477; Jeffrey W. Strong, 485 Royal Palm Way, Boca Raton, Fla. 33432

[21] Appl. No.: 753,274

[22] Filed: Nov. 22, 1996

[51] Int. Cl.⁶ .................... B29C 33/76; B29C 39/26; B63B 3/00
[52] U.S. Cl. .................... 264/258; 114/357; 249/63; 249/134; 249/142; 425/468; 425/DIG. 238
[58] Field of Search .................... 425/468, DIG. 238; 249/63, 64, 134, 142, 177; 264/257, 258; 114/357

[56] References Cited

U.S. PATENT DOCUMENTS

| | | | |
|---|---|---|---|
| 1,391,988 | 9/1921 | Zents | 249/177 |
| 1,746,696 | 2/1930 | Dows | 249/177 |
| 3,576,050 | 4/1971 | Thomas | 249/177 |
| 4,157,807 | 6/1979 | McCluskey | 249/177 |
| 4,248,823 | 2/1981 | Bader et al. | 249/177 |
| 4,264,389 | 4/1981 | Staub et al. | |
| 4,998,705 | 3/1991 | Cass | 249/63 |
| 5,071,331 | 12/1991 | Falco | 249/134 |
| 5,223,158 | 6/1993 | Lizenby | 249/63 |

FOREIGN PATENT DOCUMENTS

| | | | |
|---|---|---|---|
| 461150 | 2/1937 | United Kingdom | 249/177 |
| 918426 | 2/1963 | United Kingdom | 249/177 |

*Primary Examiner*—Jay H. Woo
*Assistant Examiner*—Joseph Leyson
*Attorney, Agent, or Firm*—Michael Ebert

[57] ABSTRACT

A molded fiberglass-reinforced resin boat hull provided with in situ holes to accommodate through-hull fittings, such as a fitting adapted to receive a rudder post. The boat hull is molded on a female mold having locating holes drilled therein in registration with the holes to be formed in the hull. Anchored by a bolt locked in each locating hole is a plug of non-stick material which projects above the mold and has a configuration defining the hole to be formed in situ in the hull. Laid down on the female mold and surrounding the projecting plugs are the reinforcing fiberglass materials and flowable uncured resin for creating the hull. When the resin is cured, it is not bonded to the plugs and the plugs and their anchoring bolts are removed to expose the in situ holes. The finished hull is then withdrawn from the female mold.

9 Claims, 3 Drawing Sheets

MOLDED BOAT HULL HAVING IN SITU HOLES TO ACCOMMODATE THROUGH-HULL FITTINGS

BACKGROUND OF THE INVENTION

1. Field of Invention

This invention relates generally to boat hulls molded of a fiberglass-reinforced resin; and more particularly to a hull of this type having in situ holes formed therein in the course of molding to accommodate through-hull fittings, as well as to a technique for molding this hull.

2. Status of Prior Art

A nautical hull is the frame or body of a boat exclusive of masts, engines or superstructure. The traditional technique for making a boat hull is by means of inner and outer wood planks running diagonally in opposite directions, or with planking consisting of large sheets of shaped plywood. But in recent years, in many modern boats the hull is molded of fiberglass-reinforced resin, the size and shape of the hull conforming to that of the female mold in which the hull is formed.

When a fiberglass reinforced hull is molded on a female mold and then removed from the mold, it then becomes necessary to drill holes in the hull to accommodate through-hull fittings. Thus a hole must be drilled to accommodate a fitting to receive the post of the rudder. And a hole must also be drilled to accommodate a fitting to receive a propeller shaft.

The Newton et al. U.S. Pat. No. 5,370,400 shows a hull having a hole drilled therein to accommodate a through-hull fitting receiving a propeller shaft at an acute angle to the hull. And in the Kramer U.S. Pat. No. 4,809,631, the bearing assembly for the rudder post goes through a hole in the hull, the assembly being at right angles to the hull.

The drilling of holes in a molded hull involves a difficult and time-consuming procedure which adds substantially to the cost of production. This drilling operation entails templates, special brackets and other guide expedients to ensure that the drilled hole is properly placed. And for this operation to be carried out correctly it takes hours of meticulous work. Should an error arise in the drilling of any hole in the molded hull, it then becomes necessary to reject the entire hull and thereby suffer a substantial loss.

The patent to Blount U.S. Pat. No. 4,365,581 describes a technique for constructing a fiberglass hull involving "the laying-up of a number of layers of resin impregnated glass fibers in a preformed female mold. In this manner a laminate of a number of layers of glass fibers is formed to the precise configuration desired for the hull of the boat." While the Blount patent shows a hull having a shaft log that goes through the hull of the boat to receive the propeller shaft, the patent does not describe how a hole is drilled or otherwise formed in the hull to accommodate the shaft log.

The Stoeberl U.S. Pat. 3,747,550 describes a fiber-reinforced plastic boat hull that is molded to include a bottom recess to receive the upper end of a keel. But this patent fails to disclose how holes are drilled or otherwise formed to receive through-hole fittings.

SUMMARY OF INVENTION

In view of the foregoing, the main object of this invention is to provide a molded hull for a boat having in situ holes formed therein to accommodate through-hull fittings, such as a fitting to receive a rudder post and a fitting to receive a propeller shaft.

Among the significant advantages of a hull in accordance with the invention are the following:

A. It does away with the need, after the hull is molded, to then drill holes therein to accommodate through hull fittings and it relieves the hull procedure of the heavy expenses entailed in correctly drilling such holes.

B. Because the holes are formed in situ in the hull in the course of molding, the holes are always correctly positioned, and no hull need be discarded because the holes therein are not exactly placed or oriented.

C. The same female mold is useable to produce at relatively low cost a large number of like hulls having in situ holes therein, and to do so at a rapid production rate, for when the resin forming the hull is cured on the female mold, the hull is then finished and requires no drilling.

More particularly, an object of this invention is to provide a technique for molding a hull having in situ holes therein, each hole in the hull being internally-threaded to receive a threaded through-hull fitting.

Briefly stated, these objects are attained by a molded fiberglass-reinforced resin boat hull provided with in situ holes to accommodate through-hull fittings, such as a fitting to receive a rudder post. The boat hull is molded on a female mold having locating holes drilled therein in registration with the holes to be formed in the hull. Anchored by a bolt locked in each locating hole is a plug of non-stick material which projects above the mold and has a configuration defining the hole to be formed in situ in the hull.

Laid down on the female mold and surrounding the projecting plugs are the reinforcing fiberglass materials and the flowable uncured resin for creating the hull. When the resin is cured, it is not bonded to the plugs and the plugs and their anchoring bolts are removed to expose the in situ holes. The finished hull is then withdrawn from the female mold.

BRIEF DESCRIPTION OF DRAWING

For a better understanding of the invention as well as other features thereof, reference is made to the detailed description of the invention to be read in conjunction with the accompanying drawing wherein.

DETAILED DESCRIPTION OF INVENTION

Figure 1:
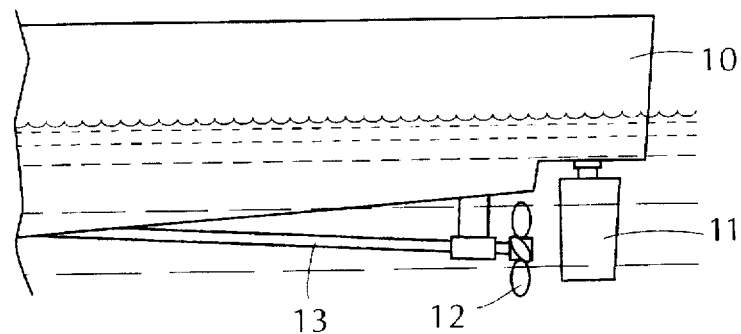
FIG. 1 illustrates a typical boat hull having a fitting to receive the post of a rudder.

The Molding Equipment:

Referring now to FIG. 1, there is shown a typical boat hull 10 molded of fiberglass-reinforced resin, the boat having a rudder 11 extends through a through-hull fitting into the hull and the shaft 13 of the propeller 12 extends through another through-hull fitting into the hull.

Figure 2:
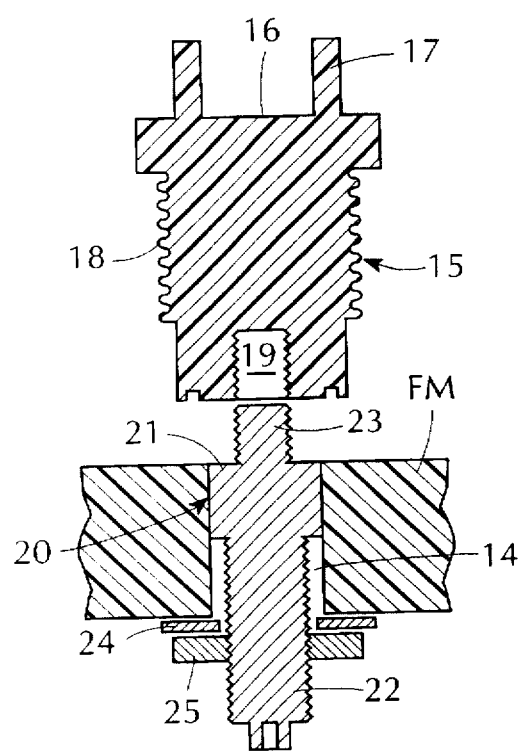
FIG. 2 shows a portion of a preformed female mold on which a hull in accordance with the invention is molded, and the figure also shows a plug to form in situ a hole in the hull, and a bolt to anchor the plug.

In a hull in accordance with the invention, holes to accommodate through-hull fittings are not drilled in the molded hull after the hull is completed, for these holes are created in situ in the hull in the course of the molding procedure. To this end the boat hull is molded on a preformed female mold FM, a portion of which is shown in FIG. 2, the size and shape of which are appropriate to that of the hull to be molded thereon. Drilled in the female mold FM at a position in registration with each hole to be formed in situ in the hull is a locating hole 14. While FIG. 2 shows only one locating hole, in practice as many locating holes are drilled as are necessary to provide the desired number of in situ holes in the hull to be molded on the female mold.

To create an in situ hole of the desired shape and size, there is provided a plug 15 machined or otherwise formed of non-stick material such as UHMW polyethylene (ultra-high molecular weight) polymeric material or other material, such as TEFLON having non-stick properties so that resin will not bond thereto.

The advantage of UHMW polyethylene and the reason it is widely used on a bearing material is that it possesses a very low coefficient of friction and corrosion resistance as well as having mechanical properties superior to other polyethylenes.

In practice, plug 15 may be fabricated of steel or other material that does not have non-stick properties, but whose outer surface is coated with a release agent, such as TEFLON which has non-stick properties.

Plug 15 which is generally cylindrical in shape, is provided with a circular head 16 having a pair of spaced pins 17 projecting above the head and an externally-threaded body 18 below the head. Formed centrally in the lower end of body 18 is an internally-threaded coupling socket 19.

Figure 3:
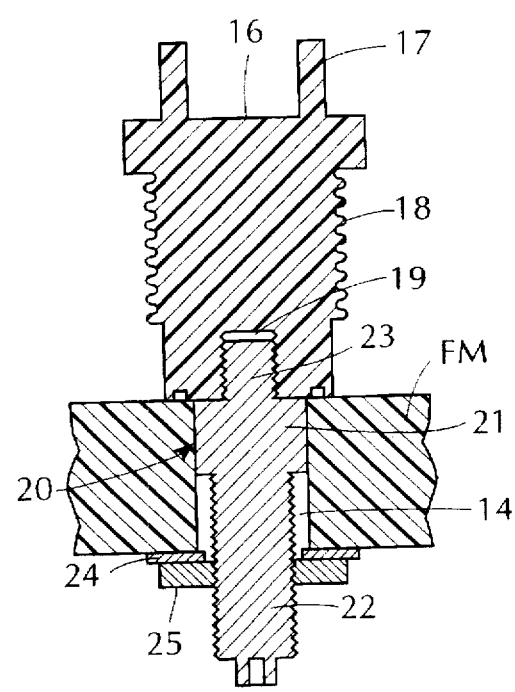
FIG. 3 illustrates the manner in which the bolt is locked in a hole drilled in the female mold to anchor the plug.

To anchor plug 15 on the female mold, a bolt 20 is provided having a cylindrical head 21 whose diameter substantially matches the diameter of hole 14 drilled in the female mold, and an externally-threaded shank 22 extending axially below head 21. Head 21 of the bolt has at its center an externally-threaded stud 23 which projects above the head and screws into the socket 19 of plug 15, thereby coupling the plug to its anchoring bolt as shown in FIG. 3.

By means of a washer 24 and a locking nut 25 received on the threaded shank 22 of bolt 20, bolt 20 is securely locked in hole 14 drilled in the female mold, and the UHMW plug 15 is drawn tightly against the inner surface of female mold FM.

The female mold FM with plugs 15 anchored thereon at positions in registration with the holes to be formed in situ in the hull is now in condition for the hull molding operation.

Figure 4:
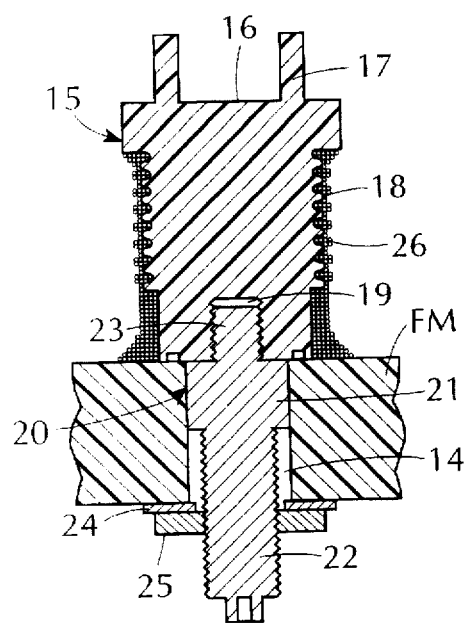
FIG. 4 shows the first step in the molding process in which a fiberglass roving is wound about the anchored plug.

The Molding Procedure:

As shown in FIG. 4, the first step in the molding procedure for forming the hull is to unidirectionally wind about the externally-threaded body 18 of the UHMW plug 15 a fiberglass roving 26. Roving 26 is then thoroughly wetted with an uncured flowable resin, such as polyester, vinyl ester or any epoxy resin.

As an alternative to winding a fiberglass roving about body 18 of the plug, the roving may be preformed into a cylindrical sleeve that is internally threaded to receive the externally-threaded body 18.

Vinyl ester resins are manufactured through an additional reaction of an epoxy resin with an acrylic monomer. The relatively low-molecular-weight precise polymer structure of the vinyl ester resins is in contrast to the high-molecular-weight random structure of the polyesters. Fiberglass-reinforced vinyl ester plastics, because of the inherent characteristics of this resin afford price and performance advantages over other plastics.

The nature of the resin must be such that it is capable of curing and hardening without however bonding to the non-stick UHMW polyethylene plug. Thus when the resin is cured an internal threading is formed in wall thereof surrounding the plug, and the plug whose shank is externally threaded, may be unscrewed from the resin.

Figure 5:
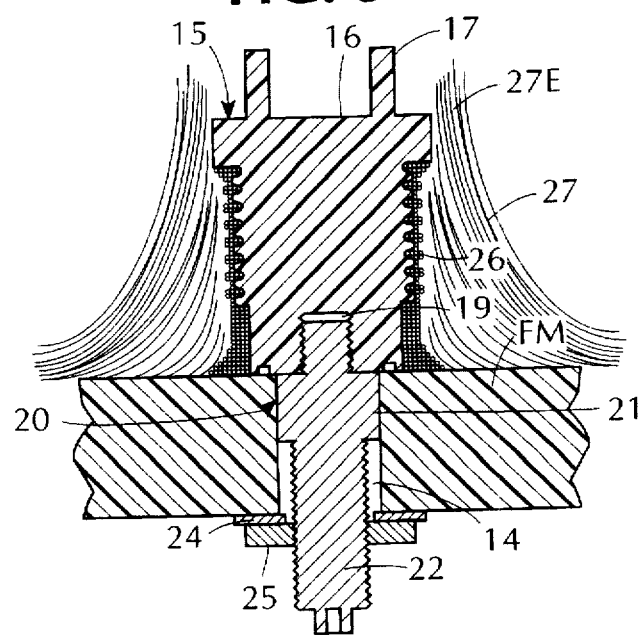
FIG. 5 shows the second step in which layers of fiberglass fabric are cut to go over and around the plug.

The next step which is shown in FIG. 5 involves normal hull "layup" on which layers 27 of fiberglass "fabric" are cut to go over and around the UHMW plug, with fiberglass ends 27E extending above the top of the plug. The fiberglass layers overlying the female mold are then wetted with the flowable uncured resin, the resin rising to a level flush with the top of the plug.

Figure 6:
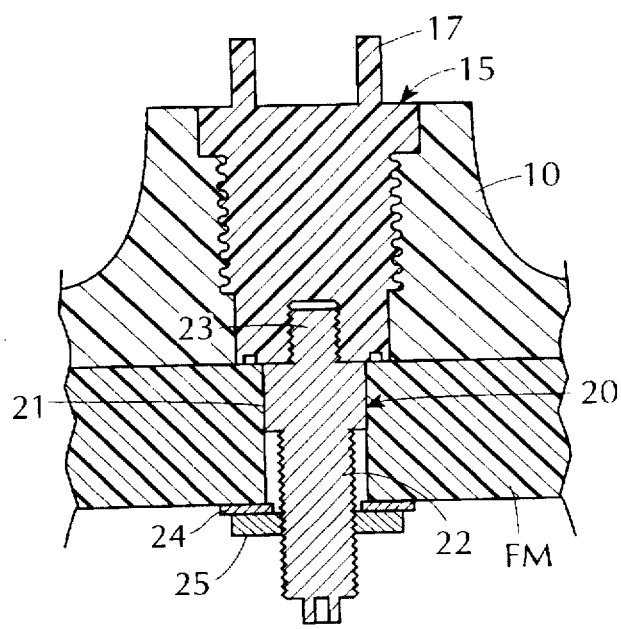
FIG. 6 shows the third step in which after the resin forming the hull is cured, the fibers projecting above the head of the plug are sanded so that they lie flush with the head.

FIG. 6 illustrates the state of the molded hull formed on female mold FM after the resin is cured. Fiberglass ends which extend above the top of plug 15 are then sanded flat so that the surface of the hull is smooth. At this stage, the hull is finished.

Figure 7:
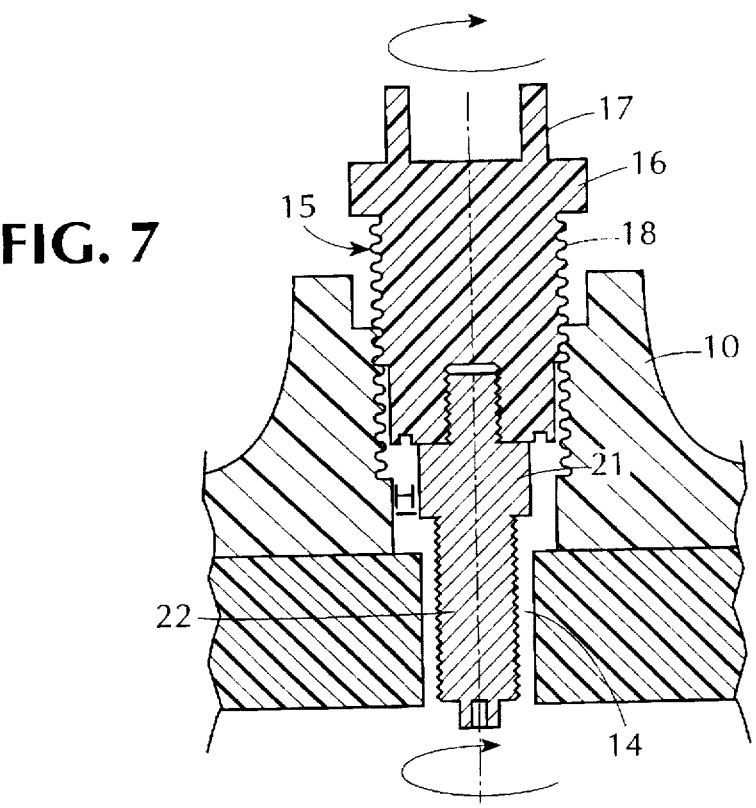
FIG. 7 shows how the plug and its anchoring bolt are removed from the in situ hole in the hull.

It is now necessary to remove the plug and its anchoring bolt. To this end, as shown in FIG. 7, washer 24 and locking nut 25 are removed from shank 22 of the bolt, so that plug 15 can then be unscrewed from the internally-threaded in situ hole H formed in the hull. For this purpose one may use a bar placed between the pins 17 projecting from the plug as a lever to unscrew the plug. When plug 15 and its anchoring bolt 20 are removed, then the in situ hole H has the configuration shown in FIG. 8, which configuration matches that of the plug.

Figure 8:
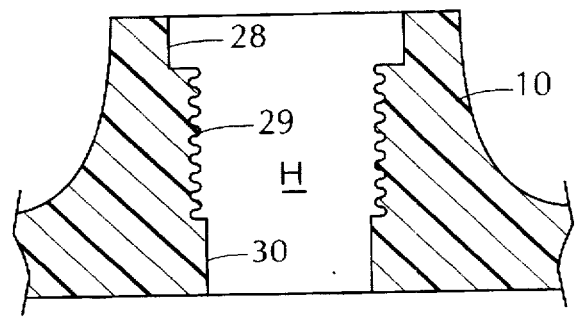
FIG. 8 shows the in situ hole in the molded hull in condition to receive a through-hull fitting.

In FIG. 8, it will be seen that in situ hole H has an unthreaded cylindrical upper section 28, an internally threaded intermediate section 29 of smaller diameter and a small diameter unthreaded lower section 30.

Figure 9:
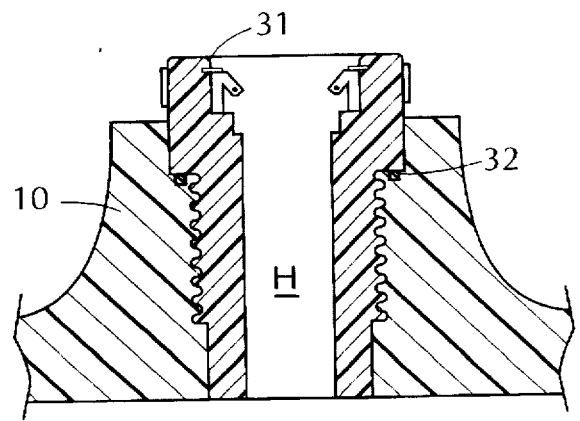
FIG. 9 shows the fitting received in the in situ hole.

A through-hull fitting appropriate for the in situ hole H formed in the molded hull is shown in FIG. 9. This fitting is a UHMW rudder port 31 specifically designed to be received in the in situ hole H. Thus the rudder port has with an upper section that is received in the upper section 28 of hole H and has an O-ring 32 that is seated on the shoulder between upper section 28 and intermediate section 29 of the hole.

The rudder port also provided with a threaded intermediate section that is threadably received in intermediate section 29 of hole H, and a lower section that fits neatly into the unthreaded lower section 30 of the hole. It is therefore a simple matter to install this through-hull fitting into hole H, for no tools are required for this purpose.

It is important to bear in mind that the configuration of the UHMW plug dictates the form of the in situ hole H, and that the configuration of plug 15 shown in the drawing is just one example of a suitable configuration. Whatever configuration is to be imparted to the in situ hole depends on the form of the through-hull fitting to be accommodated therein. Thus for some fittings the in situ hole may be a straight through hole of uniform diameter without any internal threading.

For "V" shaped and other molded hulls which require a female mold whose inner surface is inclined relative to the outer surface and is not at right angles to the rudder axis, one is then faced with the problem of positioning the plug for forming the in situ hole so that its axis is vertical. To this end, one has only to countersink the hole drilled in the female mold FM so that the lower end of the plug is seated therein and the plug is erect.

While there has been shown a preferred embodiment of a molded boat hull having in situ holes therein to accommodate through-hull fittings in accordance with the invention, it is to be understood that many changes may be made therein without departing from the spirit of the invention.

We claim:

1. Apparatus for molding a boat hull having a resin-based structure and in situ holes therein to accommodate through-hull fittings, such as a fitting to receive a rudder post; said apparatus comprising:

A. a female mold preformed to have a size and contoured shape corresponding to the hull to be molded, said mold having drilled therein at least one locating hole in registration with a hole to be formed in situ in the hull;

B. a plug having a non-stick surface and a configuration corresponding to that of the in situ hole to be formed in the hull;

C. anchoring means coupled to the plug and locked in the locating hole to support the plug over a surface of the mold; and D. means for laying down fiberglass material on the mold and around the plug and for wetting the fiberglass material with a flowable uncured resin, whereby when the resin is cured, the resultant hull then has the in situ hole formed therein occupied by the plug which is then removable from the hole.

2. Apparatus as set forth in claim 1, in which the plug is formed of ultrahigh-molecular weight polyethylene material.

3. Apparatus as set forth in claim 1, in which the plug is generally cylindrical in form and includes a head section below which is an externally threaded body section whereby when the resin surrounding the plug is cured, a matching internal thread is formed in a wall of the resin.

4. Apparatus as set forth in claim 3, in which the head section of the plug is provided with a pair of projecting pins to facilitate turning of the plug.

5. Apparatus as set forth in claim 3, in which the body section of the plug is provided at its lower end with an internally threaded socket, and said anchoring means is a bolt which is receivable in the locating hole and includes a head provided with a threaded stud that screws into said socket to couple the plug to the bolt.

6. Apparatus as set forth in claim 5, in which extending from the head of the bolt is a threaded shank in which is received a locking nut to lock the bolt in the locating hole.

7. A method for molding a resin boat hull having at least one in situ hole to accommodate a through-hull fitting; said method comprising the steps of:

A. pre-forming a female mold whose size and shape are appropriate to the hull to be molded;

B. drilling a locating hole in the mold in registration with an in situ hole to be formed in the hull;

C. anchoring a plug on a surface of the mold by means of a bolt locked in the locating hole, said plug having a non-stick surface and having a configuration which defines the configuration of the in situ hole to be formed; and D. laying down fiberglass material on the mold and around the plug and then wetting the fiberglass material with a flowable uncured resin on the mold which surrounds the plug whereby when the resin is cured, the resultant hull has the in situ hole formed therein.

8. A method as set forth in claim 7, in which the plug is formed of ultrahigh-molecular weight polyethylene material.

9. A method as set forth in claim 7, in which the resin is a vinyl ester.

* * * * *